(12) United States Patent
Beatini et al.

(10) Patent No.: US 7,953,084 B2
(45) Date of Patent: May 31, 2011

(54) PREDICTIVE MULTICAST CACHE

(75) Inventors: Patrick Beatini, La Gaude (FR); Mark Michael Clougherty, Chatham, NJ (US); Ali Reza Zaringhalam, North Caldwell, NJ (US)

(73) Assignee: Alcatel Lucent, Paris (FR)

( * ) Notice: Subject to any disclaimer, the term of this patent is extended or adjusted under 35 U.S.C. 154(b) by 83 days.

(21) Appl. No.: 12/241,282

(22) Filed: Sep. 30, 2008

(65) Prior Publication Data
US 2010/0080221 A1 Apr. 1, 2010

(51) Int. Cl.
*H04L 12/56* (2006.01)
*H04N 7/173* (2006.01)

(52) U.S. Cl. ........................................ 370/390; 725/110

(58) Field of Classification Search .................. 370/229, 370/390, 270; 725/38, 86, 238, 110, 115, 725/25
See application file for complete search history.

(56) References Cited

U.S. PATENT DOCUMENTS

| | | | | |
|---|---|---|---|---|
| 6,526,022 | B1* | 2/2003 | Chiu et al. | 370/229 |
| 7,715,391 | B1* | 5/2010 | Wadhwa et al. | 370/390 |
| 2002/0052746 | A1* | 5/2002 | Handelman | 704/270 |
| 2005/0122341 | A1* | 6/2005 | MacInnis et al. | 345/558 |
| 2007/0101377 | A1* | 5/2007 | Six et al. | 725/86 |
| 2007/0121628 | A1* | 5/2007 | Gainer et al. | 370/390 |
| 2007/0280232 | A1* | 12/2007 | Dec et al. | 370/390 |
| 2008/0301745 | A1* | 12/2008 | Liu et al. | 725/110 |
| 2009/0165043 | A1* | 6/2009 | Ou et al. | 725/38 |

* cited by examiner

*Primary Examiner* — William Trost, IV
*Assistant Examiner* — Emmanuel Maglo
(74) *Attorney, Agent, or Firm* — Brosemer, Kolefas & Associates

(57) ABSTRACT

A method is provided for distributing multicast channels from a multicast/predictive multicast cache located in at least one selected network device of a multicast network. The network device upon receiving a channel request from an end-user transmits the requested channel from the multicast cache if the requested channel is available in the multicast cache. Else, the network device requests the multicast source for the requested channel along with a group of one or more multicast channels centered at the requested channel. The network device transmits only the requested channel and other channels are cached in the multicast cache on the network device. Upon receiving a request for removing a channel the network device caches the channel for a prescribed duration before evicting the channel.

16 Claims, 4 Drawing Sheets

WINDOW-1
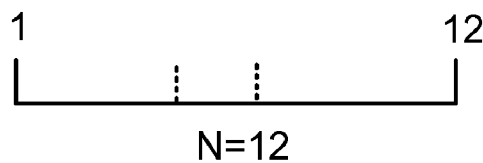
FIG.4a
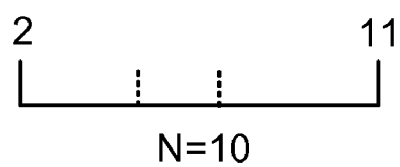
FIG.4b
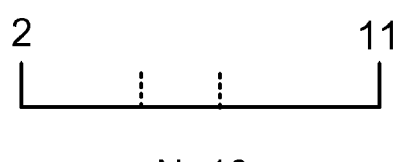
FIG.4c
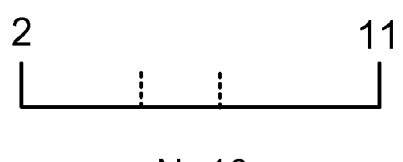
FIG.4d
WINDOW-2
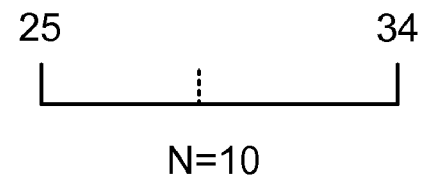
FIG.4e
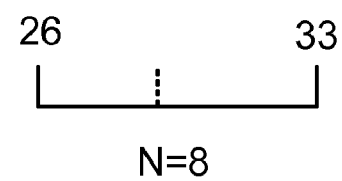
FIG.4f
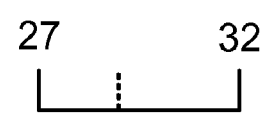
FIG.4g
FIG.4h
*FIGURE 4*

PREDICTIVE MULTICAST CACHE

FIELD OF THE INVENTION

This invention relates generally to the field of Television broadcast service and in particular to Internet Protocol Television (IP-TV) service using Internet Group Management Protocol (IGMP).

BACKGROUND OF THE INVENTION

Internet Protocol Television (IP-TV) service providers multicast a large number of channels from a multicast source occupying a central location, to end-users in a multicast group through several network devices disposed between the multicast source and the multicast group.

Each network device has IGMP capabilities and replicates a multicast traffic according to demands coming from the end-users. In operation, when an end-user communicates a 'join/leave channel' request to one of the network devices, the request is propagated to the multicast source through each one of the network device disposed between the end-user and the multicast source.

In setting up or leaving a channel, the network devices disposed between the multicast source and end-users need to process the request. Significant latency takes place between the 'join/leave channel' request and channel delivery/removal. In an event of frequent channel changing by the end-user (known as channel zapping) this latency results in significant penalty.

SUMMARY OF THE INVENTION

A method is disclosed for provisioning multicast channels from a multicast source to end-users in a multicast network so as to significantly reduce latency between a request for 'join/leave channel' and channel delivery/removal.

According to one aspect of the method a network device upon receiving a 'join channel' request, verifies a multicast cache for the requested channel. If the channel is available in the multicast cache the network device provisions the channel from the multicast cache. If the channel is not available in the multicast cache, the network device forwards the 'join channel' request to the multicast source and upon receiving the channel from the multicast source, provisions the channel to the end-users.

According to yet another aspect of the method if a requested channel is not available in the multicast cache, the network device forwards the request for the channel along with a pre-determined number of additional channels thereby, predictively pre-fetching channels in the multicast cache. The requested channel and the additional channels comprise a channel window preferably centered at the requested channel. Upon receiving the channels from the multicast source, the network device provisions only the requested channel to the end-user.

According to another aspect of the method, in an event of channel zapping, the network device first verifies whether the desired channel is pre-fetched in the multicast cache. If the desired channel is pre-fetched, then the network device provisions the requested channel from the multicast cache to the end-user. Else, the network device forwards the request to the multicast source.

According to another aspect of the method each end-user is allotted a separate channel window of a predetermined window size. In an event of overlapping channel windows between one or more end-user, the network device merges the overlapping channel windows to a single channel window.

According to another aspect of the method the network device automatically slides the channel window to center the channel window at the requested channel. In an event of a 'skip channel' where the end-user enters a new 'join channel' request that is not within the current channel window, the network device automatically pre-fetches channels centered at the requested channel such that the new channel window is centered at the newly requested channel.

According to one aspect of the method the multicast cache size is equal to a pre-determined number of channels that can be cached on a network device. The total number of cached channels (cache size) is equal to the number of channels in channel windows minus the number of requested channels. Preferably, the cache size is less than or equal to the multicast cache size.

If the combined total cache size of the channel windows is larger than the multicast cache size, the network device reduces one or more of the channel windows such that the combined total cache size is less than or equal to the multicast cache size. The channel windows are reduced in a balanced fashion such that the number of channels removed from each window is preferably the same. According to yet another aspect more channels are removed from the window with fewer end-users.

According to another aspect of the method upon receiving a 'leave channel' request, the network device does not evict the channel. Instead it caches the channel in the multicast cache for a duration determined by network resources and operation. At the end of such duration the network device transmits the request to the multicast source to stop transmitting the requested channel. The duration for which channels are cached is determined according to different criteria including a timing device attached to each end-user that the network device starts and stops according to pre-determined timing criteria.

BRIEF DESCRIPTION OF THE DRAWING

These and other aspects of the invention can be fully appreciated by the following disclosure in view of accompanying drawing figures in which:

FIG. 4 graphically shows application of an exemplary set of rules to reduce channel window size.

DETAILED DESCRIPTION

The principles of this invention may be practiced in any multicast network. Each embodiment describing a particular aspect of the invention is only meant to be illustrative and should not be construed as limiting. It must be understood that each embodiment emphasizing a particular aspect of the invention does not necessarily exclude other aspects described by means of a different embodiment. It will be apparent to those skilled in the art that one or more different aspects described by means of different exemplary embodiments may be readily combined to practice the invention as a whole.

Figure 1:
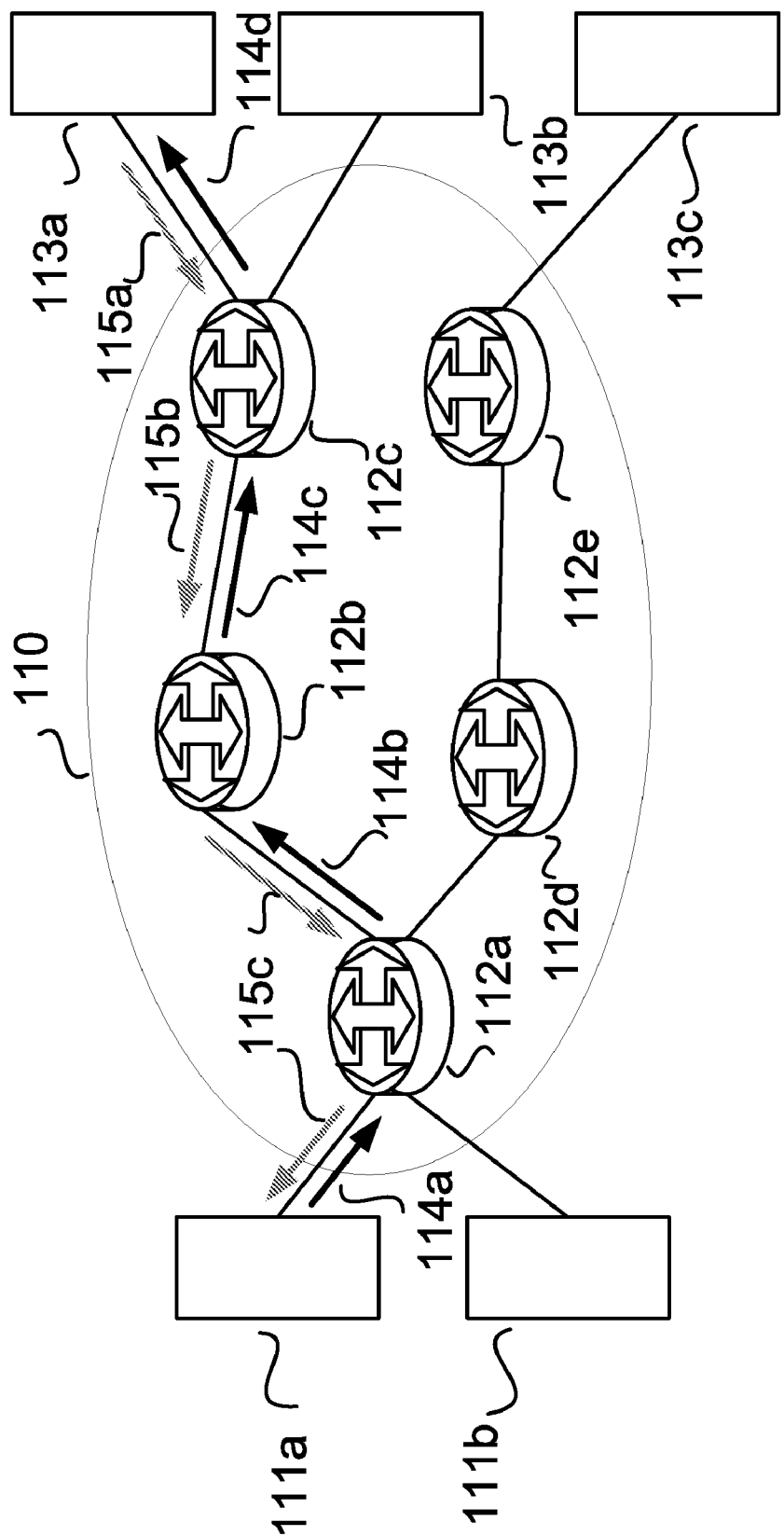
FIG. 1 is a schematic of a network connection between multicast sources and end-users.

Referring now to FIG. 1, there it shows an example of a network topology 100 where this invention can be practiced. In particular, in a multicast network 110 a multicast source 111a is connected to multiple end-users 113a . . . 113c forming a multicast group through several network devices 112a . . . 112c. Each network device has Internet Group Management Protocol (IGMP) capabilities such that the network devices replicate the multicast channels according to demands coming from the end-users.

According to a prior art method of operation, a 'join channel' request from an end-user (for example 113a) is forwarded upstream through the network devices 112c . . . 112a to the multicast source via a path shown by arrows 115a . . . 115. The requested channel(s) is provisioned from the multicast source downstream through the network devices 112a . . . 112c to the end-users (113a) via a path shown by arrows 114a . . . 114d. When a 'leave channel' request is received from the end-user, the network devices forward the request upstream to the multicast source via the path shown by arrows 115a . . . 115c, and the channel(s) are evicted from the network devices.

It can be appreciated that every time any one of the end-users in the multicast group transmits a 'join channel' or a 'leave channel' request, each network device connected between the multicast group and the multicast source processes the request to join/leave the requested channel, resulting in significant latency between the 'join/leave channel' request and the channel delivery/removal. If the end-user changes channel frequently (phenomenon known as 'channel zapping'), the latency in the process of setting up/evicting a channel results in a penalty.

A method of multicast cache or predictive multicast cache according to the principles of the invention may be implemented in one or more selected network devices connecting a multicast source to end-users. Referring back to FIG. 1, in one exemplary implementation the network device 112c nearest to the end-users 113a and 113b is selected to include a multicast cache. The multicast cache represents a pre-determined number of channels including the requested channel, retained on the network device. The maximum number of channels that can be cached at a given time is known as the multicast cache size, which depends for example, on a bandwidth allocated for the multicast cache.

In general, the channels are cached for a fixed duration determined by one or more prescribed criterion set out in accordance with network resources and operation. For example, the network device has a timer attached to each cached channel that is operated for a fixed duration, after which duration a cached channel is evicted. It may be understood that there can be other criteria to determine multicast cache size or the duration for which the channels are cached without digressing form the basic principles of the invention.

In operation, upon receiving a 'join channel' request from the end user 113a, the selected network device 112c first checks the multicast cache for the requested channel. If the requested channel is available in the multicast cache, the network device transmits the requested channel from the multicast cache to the end-user. If the requested channel is not available in the multicast cache, the network device forwards the request to the multicast source via the other upstream network devices 112b and 112a, unless it is replicated in the network device for another end-user. Upon receiving the requested channel from the multicast source, the network device transmits the channel downstream to the end-user.

Upon receiving a 'leave channel' request from the end-user, the network device while still receiving the channel from the multicast source, immediately stops transmitting the channel downstream to the end-user. The network device does not evict the channel or forwards the 'leave channel' request to the multicast source immediately. Instead, the network device caches the channel to be evicted in the multicast cache for a prescribed duration, after which the network device forwards the 'leave channel' request to the multicast source and evicts the channel from the network device. It should be noted that the channel is evicted provided it is not replicated in the network device for another end-user connected to the network device.

It can be well appreciated that in the exemplary method, each time a request is received the network device nearest to the end-user does not necessarily forwards a 'join/leave channel' request upstream. As a result, when a channel is delivered/evicted, the other network devices located upstream do not necessarily process the request. Therefore the latency, and the penalty due to latency between the 'join/leave channel' request and the channel delivery/eviction are significantly reduced, even if the end-user changes channel frequently.

In another exemplary method of a predictive multicast cache, the multicast cache is filled predictively, by pre-fetching a group of channels together with the requested channel. Referring again to FIG. 1, upon receiving a 'join channel' request, the network device 112c forwards a request for a group of channels including the requested channel, provided it is not replicated in the network device for another end-user. The group of channels forms a multicast channel window. While the network device receives all the channels in the channel window it only transmits the requested channel to the end-user. The rest of the channels are cached in the multicast cache.

The number of cached channels (cache size) is equal to the total number of channels in the channel window minus the number of requested channels at a given instant. It should be noted that the cache size must be equal to, or less than the 'multicast cache size'. For example, if the end-user requests channel 10, the network device requests a channel window of 5-15 channels, but transmits only channel 10 to the end-user. Channels 5-9, and 11-15 are cached. In this example, the number of cached channels (cache size) is equal to 10 channels. It can be well appreciated that if the end-user changes channel by zapping up or down, several cached channels adjacent to the requested channel are readily available for transmission without incurring penalty.

Figure 2:
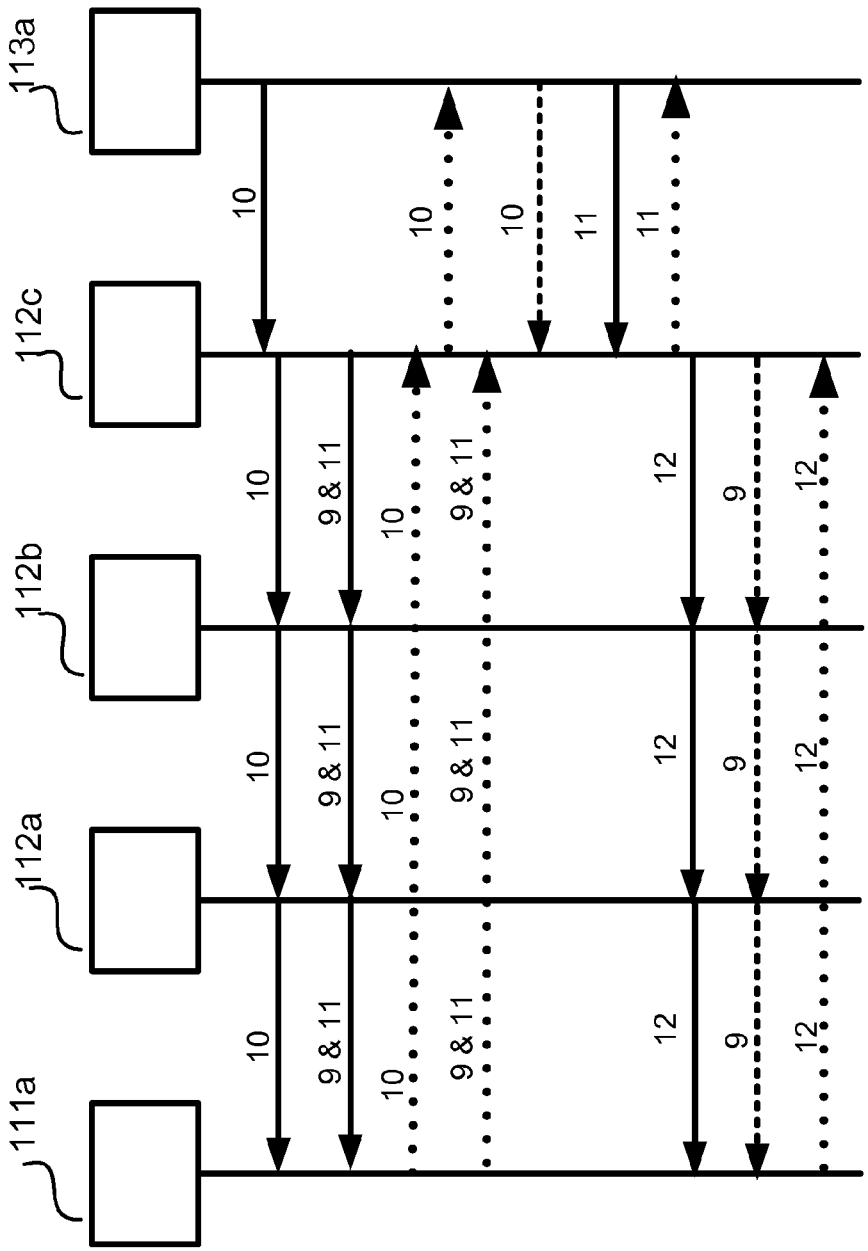
FIG. 2 is an exemplary message exchange between an end-user and a multicast source for a 'join channel' and a 'leave channel' request.

Advantageously, in the method of predictive multicast cache the network device can slide the channel window such that the channel window is preferably centered at the requested channel. FIG. 2 graphically shows an exemplary message exchange sequence 200, between an end-user 213a and the multicast source 211 via the network devices 212a . . . 212c.

In particular, the messages originating from the end-user 213a and forwarded upstream (pointing right-to-left) towards the multicast source are shown by solid arrows for 'join channel' and dashed arrows for 'leave channel' requests, respectively. Dotted arrows pointing left-to-right show channels transmitted downstream from the multicast source towards the end-user 213a. For the purpose of illustration numbers above the arrows indicate channel numbers that are requested, forwarded, or transmitted, respectively, between different network elements.

More specifically, the end-user 213a sends a 'join channel 10' request upstream to the network device 212c. The request is forwarded upstream through the network devices 212b and 212a to the multicast source 211a. The network device 212c simultaneously forwards 'join channels 9 & 11' request upstream to the multicast source 211a. In response, the multicast source transmits channels 9, 10 and 11 downstream through the network devices 212a . . . 212c. The network device 212c transmits only channel 10 to the end-user 213a, and caches channels 9 and 11.

In a following sequence, the end-user 213a sends a 'leave channel 10' and 'join channel 11' requests to the network device 212c. In response, the network device 212c transmits channel 11 from the cache to the end-user 213a. However, the network device does not forward the 'leave channel 10' request upstream to the multicast source 211a. Instead, it forwards a 'leave channel 9' and a 'join channel 12' request upstream to the multicast source 211a. It should be noted that in the above example, the network device by evicting channel 9 and adding channel 12 to the window, slides the channel window such that the new channel window is centered at the newly requested channel 11.

The concept of sliding channel window is applicable to another exemplary situation where the end-user skips channels and directly enters a channel number, which is not within the channel window being currently viewed by the end-user. In that case the network device monitors the 'channel skip' and accordingly forwards 'join channel' and 'leave channel' requests to the multicast source such that the cached channels in the new channel window are centered at the new channel number entered by the end-user.

Another aspect of the invention is that each end-user is allotted independent channel windows. However, network resources are better utilized by merging channel windows if the multiple end-users have overlapping channel windows. In particular, the network device adjusts the window size of one or more end-users, such that combined cache size of all the channel windows is less than or equal to the 'multicast cache size'. The following disclosure illustrates merging of channel windows according to a set of exemplary rules.

Figure 3:
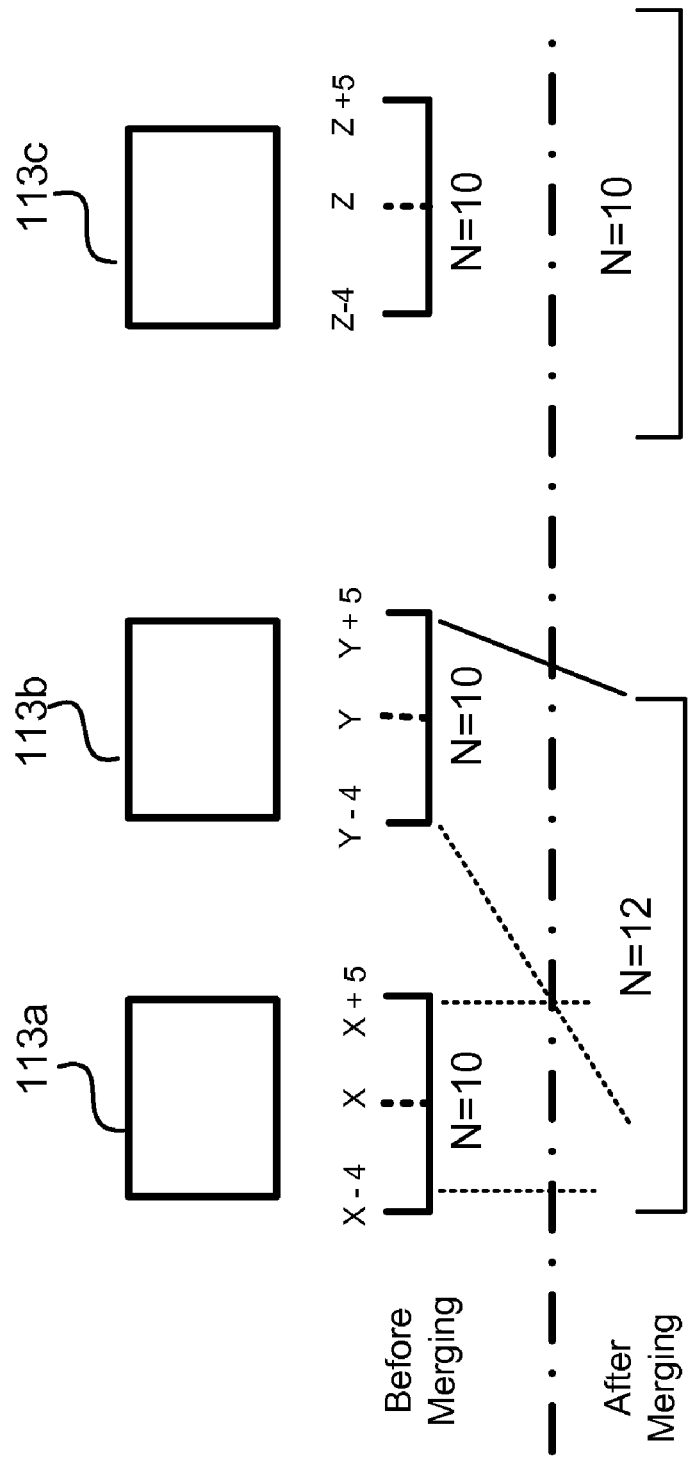
FIG. 3 schematically shows an example of merging channel windows for overlapping channel windows.

Referring now to FIG. 3, it shows a schematic 300 including channel windows for three end-users 313a . . . 313c connected to a network device 312. For illustrative purpose, it is assumed that each end user is allotted a channel window of 10 channels centered at three different requested channels (for example, X=5, Y=7 and Z=29, respectively). It is further assumed that the 'multicast cache size' is 12 channels. This is graphically illustrated in the upper part of FIG. 3 (before merging). The combined cache size of all channel windows is equal to 27 channels (30–3 channels), which exceeds the 'multicast cache size' of 12 channels.

In order to reduce the combined cache size, the network device reduces channel windows. From the example shown in FIG. 3, the end-users 313a and 313b have overlapping channel windows shown above the dash-dot line (before merging). The network device 312 combines the overlapping channel windows into one channel window including channels 1-12 (X–4 to Y+5), whereas the third end-user 313c is allotted an independent window as the requested channel is far removed from the channels requested by the other end-user 313c. After merging the channel windows, there are only two channel windows as shown below the dash-dot line (after merging).

Accordingly, the combined window size of the channel window-1 is equal to 12 channels, and the window size of the channel window-2 is 10 channels having a combined cache size of 19 (22-3). The network device reduces the combined cache size according to an exemplary set of rules—
   a. the window size reduction should be balanced, i.e., the number of channels removed from each window should preferably be the same (if possible), and
   b. if after application of the rule a, there are remaining channels to be removed, then remaining channels are removed from the window having fewer users.

For the illustrative embodiment described in reference with FIG. 3, these rules are applied in the following sequence—
   i. calculate number of window frontiers=Number of windows*2, and
   ii. calculate the balanced number of channels to be removed on all windows=(cache size–multicast cache size)/number of window frontiers.

The sequence of channel removal is graphically illustrated in FIGS. 4a-4h, respectively. For the example shown in FIG. 3, the number of window frontiers is 2*2=4, and the number of channels to be removed per frontier is (19–12)/4=7/4. FIGS. 4a-4d show the sequence of operations for channel window-1, wherein the heavy dotted lines represent the requested channels (5 and 7, shown in FIG. 3) and FIGS. 4e-4h shows the sequence of operation for the channel window-2, wherein the heavy dotted line represents the requested channel (29 shown in FIG. 3).

Considering that only an integer value is meaningful, the network device removes one channel each per frontier in both the windows according to the sequences i and ii. As a result, the window-1 is reduced to include channels 2-11 (FIGS. 4a to 4b) and the window-2 is reduced to include channels 26-33, respectively (FIGS. 4e to 4f). After removing 4 channels there are three remaining channels to be removed. This is performed according to rule b.

Since window-2 has fewer end-users, the remaining three channels are removed from the window-2. Following the sequences i and ii, the network device removes one channel from each frontier in window-2 to include channels 27-32 as illustrated in FIG. 4g. The network device removes the last channel in window-2 only on one frontier, preferably on the far frontier, such that the channels in the window-2 are preferably centered at the requested channel (29). Accordingly, the window-2 is reduced to include channels 27-31 as shown in FIG. 4h. Those skilled in the art will be able to recognize that the sequence of operations to reduce window size is only meant to be illustrative. It is possible to implement other sequences within the principles outlined in this example.

In describing the exemplary embodiments it is assumed that the cached channels in the multicast cache are contiguous and ordered in a sequence. In real scenario, this assumption is not always valid. In those circumstances, the method includes additional features to simulate contiguous and ordered channels. For example, one way to have an order coherency, the network device provides a way to provision the multicast channel order by applying a provisioning model based on an array, wherein the array index gives the channel order, while the array content gives multicast Internet Protocol (IP) address of the multicast channel. It can be well appreciated that other methods to provision ordered channels are equally valid in conjunction with the method of multicast cache described herein.

Since the size of the cache is based on the provisioned bandwidth dedicated for multicast cache management, sometimes it is necessary to flush cached channels. For example, when the end-user sends a 'leave channel' request the network device does not immediately evict the channel from the system. Instead it caches the channel whereby, the channel window stays stuck in the multicast cache. In order to use the cache more efficiently, it is necessary to dynamically flush the channels and channel windows that are no longer required, from the multicast cache.

This can be achieved for example by a Least Recent Used (LRU) algorithm or/and by attaching an electronic timer to each cached channel. Accordingly, the network device maintains electronic timers for the cached channels associated with each end-user. For each end-user the network device starts a timer as the end-user leaves a channel window, and it stops the timer when the end-user sends a new 'join channel' request. The network device deletes the channel window associated with the end-user if the timer elapses.

It can be appreciated that the exemplary embodiments described above are merely illustrative of the principles of multicast cache and predictive multicast cache. According to the principles of the invention a multicast cache may be included in any one or all of the network devices, but it is not necessary to do so. It may be sufficient to include the multicast cache only in the network devices nearest to the end-user(s). The principles are applicable in any multicast network including the most commonly known multicast Ethernet™ networks. The advantages of the invention can be fully appreciated by the scope of the following appended claims.

What is claimed is:

1. A method of multicast channel distribution comprising the steps of:
   at least one end-user sending a channel request to at least one network device, wherein upon receiving the channel request, the at least one network device;
   verifying, if the requested channel is available in a multicast cache on the network device, and if the requested channel is not replicated at least once for another end-user; and
   if the requested channel is available in the multicast cache then
      provisioning the requested channel to the at least one end-user from the multicast cache; else
      forwarding the channel request and a predetermined number of additional requests for pre-fetching the predetermined number of additional channels to the multicast source;
      receiving the requested channel along with the one or more additional channels from the multicast source,
      caching the predetermined number of additional channels in the multicast cache, and
      provisioning only the requested channel to the at least one end-user, so as to reduce the penalty;
      wherein the requested channel and the cached predetermined number of additional channels comprise a channel window having a center at the requested channel.

2. The method of claim 1, wherein the multicast cache is a predictive multicast cache having a multicast cache size of a pre-determined number of channels.

3. The method of claim 1, wherein upon receiving a new channel request in a channel window other than the current channel window, the network device sliding the channel window thereby, centering the new channel window preferably at the newly requested channel.

4. The method of claim 1, wherein the network device reducing one or more channel window such that, the total number of the cached channels in the channel window does not exceed the multicast cache size.

5. The method of claim 2, wherein the network device allotting a respective channel window to each end-user.

6. The method of claim 1, wherein the multicast cache is flushed periodically such that the cache size does not exceed the multicast cache size.

7. The method of claim 2, wherein the network device evicts one or more cached channels such that, the total number of cached channels does not exceed the multicast cache size.

8. The method of claim 5, wherein the network device reducing one or more of the channel windows such that, a combined cache size of the channel windows is less than, or equal to the multicast cache size.

9. The method of claim 5, wherein the respective channel windows have substantially the same window size.

10. The method of claim 5, wherein the respective channel windows of one or more end-users substantially overlap.

11. The method of claim 6, wherein a method for periodically flushing the multicast cache is the one selected from a Least Recent Uses (LRU) algorithm, attaching a timer to each cached channel, and a combination thereof.

12. The method of claim 10, wherein two or more overlapping channel windows are merged.

13. The method of claim 11, wherein the network device maintains the timers attached with each cached channel, such that each cached channel is periodically flushed in a prescribed manner.

14. The method of claim 12, wherein the network device reducing one or more of the channel windows after merging overlapping channel windows such that, a combined cache size of the channel windows is less than, or equal to the multicast cache size.

15. A method of removing a multicast channel comprising the steps of:
   at least one end-user sending a 'leave channel' request to at least one network device, wherein upon receiving the request, the at least one network device;
   stopping the transmission of the requested channel to the end-user;
   caching the requested channel in a multicast cache after stopping the transmission to the end user for a prescribed duration;
   verifying if the requested channel is not replicated at least once for another end-user after stopping the transmission to the end user; and
   evicting the requested channel from the multicast cache after the prescribed duration, so as to reduce the penalty.

16. The method of claim 15, wherein the network device evicting channels by operating electronic timers attached to the cached channel.

* * * * *